US008262919B1

(12) United States Patent
Luo et al.

(10) Patent No.: US 8,262,919 B1
(45) Date of Patent: Sep. 11, 2012

(54) METHOD AND SYSTEM FOR PROVIDING A PERPENDICULAR MAGNETIC RECORDING POLE USING MULTIPLE CHEMICAL MECHANICAL PLANARIZATIONS

(75) Inventors: Guanghong Luo, Fremont, CA (US); Changqing Shi, San Ramon, CA (US); Danning Yang, Fremont, CA (US); Jinwen Wang, Fremont, CA (US); Ming Jiang, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 259 days.

(21) Appl. No.: 12/824,036

(22) Filed: Jun. 25, 2010

(51) Int. Cl.
*B44C 1/22* (2006.01)

(52) U.S. Cl. .............................. 216/22; 438/3

(58) Field of Classification Search .................. 216/22; 438/3; 29/603.14, 603.15
See application file for complete search history.

(56) References Cited

U.S. PATENT DOCUMENTS

| 5,618,381 | A | 4/1997 | Doan |
| 5,928,959 | A | 7/1999 | Huckels |
| 6,004,653 | A | 12/1999 | Lee |
| 6,251,788 | B1 | 6/2001 | Liou |
| 6,328,859 | B1 | 12/2001 | Hsiao |
| 6,383,935 | B1 | 5/2002 | Lin |
| 6,391,780 | B1 | 5/2002 | Shih |
| 6,630,390 | B2 | 10/2003 | Andideh |
| 6,821,899 | B2 | 11/2004 | Lohokare |
| 6,939,796 | B2 | 9/2005 | Lohokare |
| 7,139,153 | B2 | 11/2006 | Hsiao |
| 7,217,649 | B2 | 5/2007 | Bailey |
| 7,248,434 | B2 | 7/2007 | Dill |
| 7,296,339 | B1 | 11/2007 | Yang et al. |
| 7,552,523 | B1 | 6/2009 | He et al. |
| 8,136,225 | B1 * | 3/2012 | Zhang et al. ............... 29/603.12 |
| 2006/0044681 | A1 | 3/2006 | Le |
| 2006/0174474 | A1 | 8/2006 | Le |
| 2006/0288565 | A1 | 12/2006 | Le |
| 2007/0115584 | A1 | 5/2007 | Balamane |
| 2007/0245544 | A1 | 10/2007 | Allen |
| 2008/0148552 | A1 | 6/2008 | Pentek |
| 2008/0151437 | A1 | 6/2008 | Chen |
| 2008/0244896 | A1 | 10/2008 | Bonhote |

* cited by examiner

*Primary Examiner* — Roberts Culbert

(57) ABSTRACT

A method and system for providing a pole of magnetic transducer having an intermediate layer are described. The method and system include providing a trench in the intermediate layer and depositing a nonmagnetic liner. A portion of the nonmagnetic liner resides in the trench. At least one seed layer is deposited. A portion of the at least one seed layer resides in the trench. The method and system include depositing at least one main pole layer. The at least one main pole layer is magnetic. A portion of the main pole layer(s) reside in the trench. The method and system also include performing a first chemical mechanical planarization (CMP). An excess portion of the seed layer(s) external to the trench are removed through an ion beam etch. The method and system further include performing a second CMP to remove an excess portion of the nonmagnetic liner external to the trench.

16 Claims, 10 Drawing Sheets

METHOD AND SYSTEM FOR PROVIDING A PERPENDICULAR MAGNETIC RECORDING POLE USING MULTIPLE CHEMICAL MECHANICAL PLANARIZATIONS

BACKGROUND

FIG. 1 is a flow chart depicting a conventional method 10 for fabricating a conventional perpendicular magnetic recording (PMR) transducer. For simplicity, some steps are omitted. The conventional method 10 is used for providing a PMR pole. An intermediate layer is provided, via step 12. The intermediate layer is typically aluminum oxide. A mask is provided on the aluminum oxide layer, via step 14. The mask may be a hard mask patterned using a photoresist mask. The mask includes an aperture above the portion of the aluminum oxide layer in which the PMR pole is to be formed. Using the mask, a trench is formed in the aluminum oxide layer, via step 16. The top of the trench is wider than the trench bottom. In addition, the trench may extend through the aluminum oxide layer to the underlayer. As a result, the PMR pole formed therein will have its top surface wider than its bottom. Consequently, the sidewalls of the PMR pole have a reverse angle.

The conventional PMR pole materials are deposited, via step 18. Step 18 may include plating or sputtering ferromagnetic pole materials as well as seed layer(s). In addition, nonmagnetic and seed layers may be deposited prior to the conventional PMR pole materials. A single chemical mechanical planarization (CMP) is then performed, via step 20. The single CMP may be performed after an insulating refill layer has also been deposited over the pole materials. The CMP is performed such that the insulating and pole materials may be removed at a sufficiently high rate to have a desired throughput. For example, a down force of at least three psi and in some cases four to six psi may be used. In addition, a slurry appropriate for the materials being removed and the desired time may be used in the CMP. Such a CMP may remove approximately sixty nanometers of aluminum oxide deposited on the pole materials in approximately five through fifteen seconds. The pole may be milled to its final height, via step 22. Subsequent structures, such as a write gap and shields, may also be fabricated.

Although the conventional method 10 may provide a conventional PMR transducer, there may be drawbacks. Despite the CMP, there are variations in the height of the pole after the CMP is performed. For example, dishing in the pole region may occur. These variations may be magnified by the ion mill performed in step 22. Thus, the height and width of the pole may vary. Further, the method 10 may be difficult to scale to even higher areal densities. Accordingly, what is needed is an improved method for fabricating a PMR transducer.

SUMMARY

A method and system for providing a pole of magnetic transducer having an intermediate layer are described. The method and system include providing a trench in the intermediate layer and depositing a nonmagnetic liner. A portion of the nonmagnetic liner resides in the trench. At least one seed layer is deposited. A portion of the at least one seed layer resides in the trench. The method and system include depositing at least one main pole layer. The at least one main pole layer is magnetic. A portion of the main pole layer(s) reside in the trench. The method and system also include performing a first chemical mechanical planarization (CMP). An excess portion of the seed layer(s) external to the trench are removed through an ion beam etch. The method and system further include performing a second CMP to remove an excess portion of the nonmagnetic liner external to the trench.

DETAILED DESCRIPTION OF THE PREFERRED EMBODIMENTS

Figure 1:
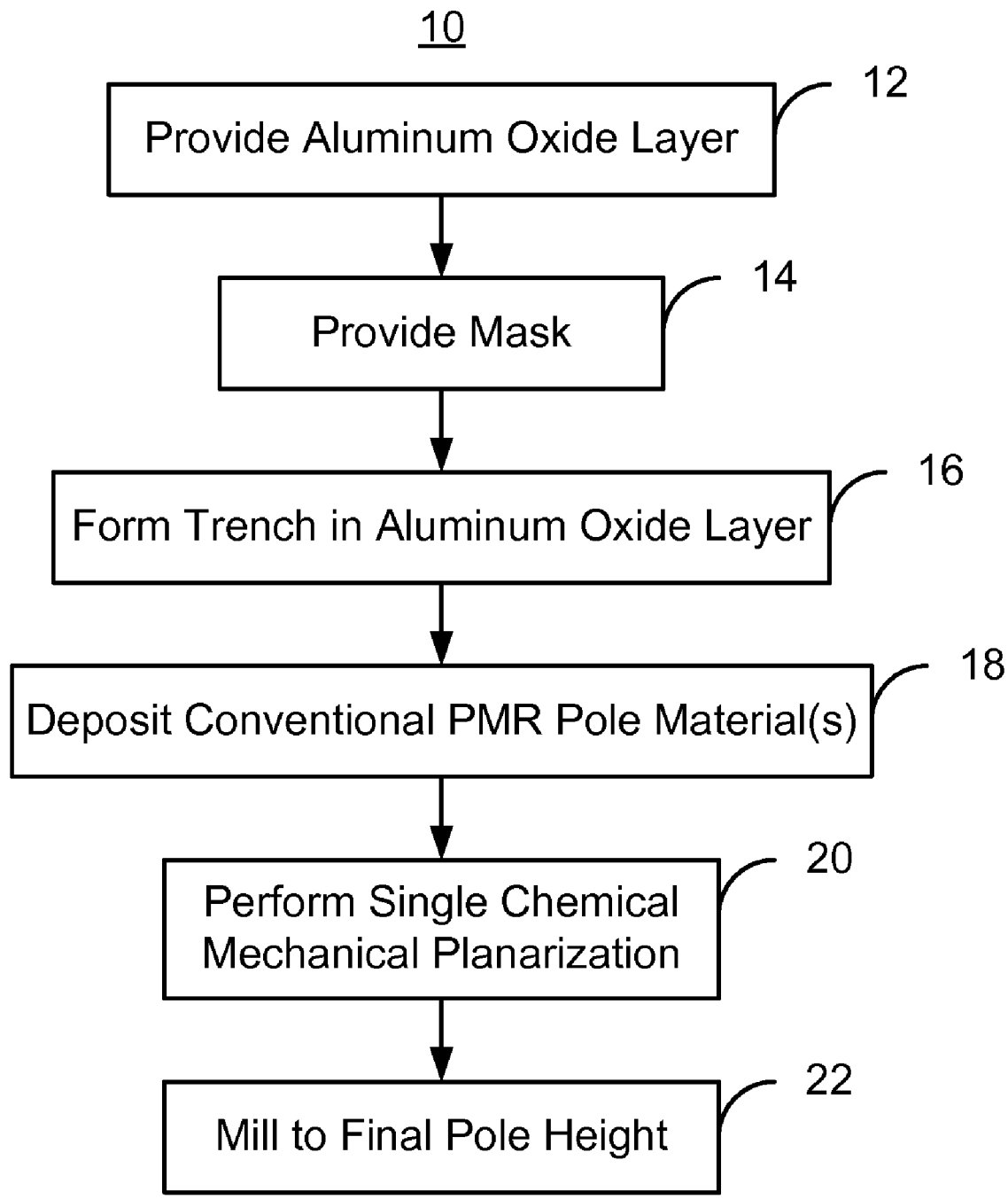
FIG. 1 is a flow chart depicting a conventional method for fabricating a PMR transducer.
Figure 2:
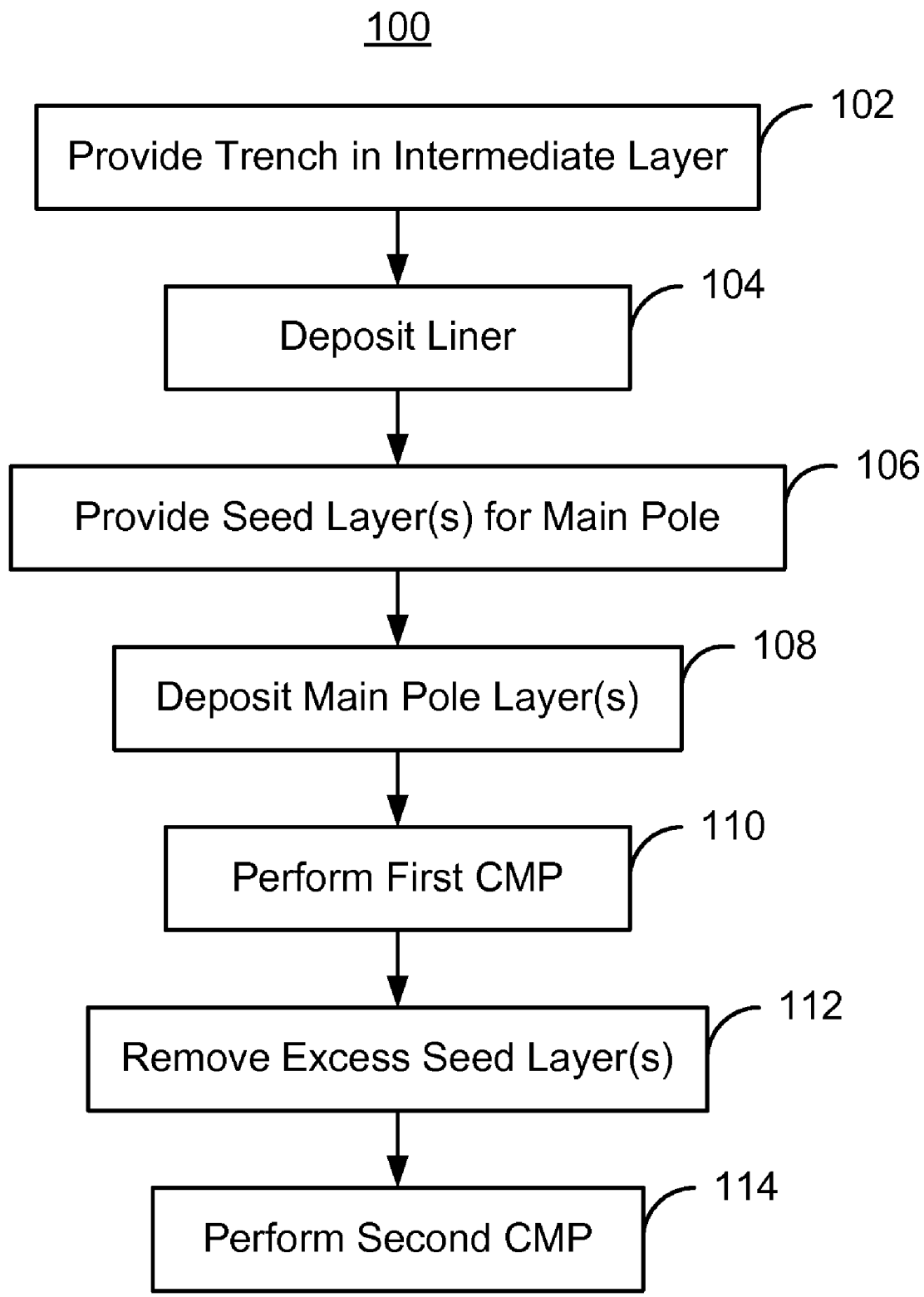
FIG. 2 is a flow chart depicting an exemplary embodiment of a method for fabricating a PMR transducer.

FIG. 2 is a flow chart depicting an exemplary embodiment of a method 100 for fabricating a transducer. The method 100 is described in the context of a PMR transducer, though other transducers might be so fabricated. For simplicity, some steps may be omitted and/or combined. The PMR transducer being fabricated may be part of a merged head that also includes a reader (not shown) and resides on a slider (not shown) in a disk drive. The method 100 also may commence after formation of other portions of the PMR transducer. The method 100 is also described in the context of providing a single PMR pole and its associated structures in a single magnetic recording transducer. However, the method 100 may be used to fabricate multiple transducers at substantially the same time. The method 100 and system are also described in the context of particular layers. However, in some embodiments, such layers may include multiple sub-layers. In one embodiment, the method 100 commences after formation of the underlayer(s) on which the PMR pole is to reside and the intermediate layer in which the pole is formed. The intermediate layer is nonmagnetic and may be insulating. For example, aluminum oxide may be used for the intermediate layer. The underlayer may be nonmagnetic and an etch stop for the intermediate layer. For example, the underlayer may include Cr.

A trench is provided in the intermediate layer, via step 102. Step 102 may include providing a mask having an aperture located above the desired location of the trench. The mask may be a hard mask that is patterned, for example through the use of a photoresist mask. In other embodiments, a photoresist or other mask might be used. The underlayer may be a stop layer for the removal process used in step 106. For example, an alumina reactive ion etch (RIE) may be performed in step 102 to form the trench and Cr may be used for the underlayer. The trench may have a top wider than its bottom. Thus, the main pole may also have a bottom and a top wider than the bottom.

A nonmagnetic liner is deposited after the trench is formed, via step 104. Various deposition methods and materials may be used. For example, aluminum oxide may be deposited using atomic layer deposition (ALD) or another method. Thus, a portion of the nonmagnetic liner resides in the trench. Seed layer(s) for the main pole are deposited, via step 106. In some embodiments, CMP stop and buffer layers are deposited outside of the trench prior to deposition of the seed layers. A portion of the seed layer(s) reside in the trench formed in step 102. The seed layer(s) may have a thickness of not more than two hundred and fifty nanometers. However, in other embodiments, different thicknesses may be used. The seed layer provided in step 104 is used in depositing the main pole layer(s).

Main pole layer(s) are deposited, via step 108. The main pole layer(s) are magnetic. For example, the main pole layer(s) may include one or more high saturation magnetization materials, such as CoNiFe. For example sputtering and/or plating may be used in step 108 for depositing the magnetic layer(s). The materials may be a single layer such as an alloy, or a multilayer. A portion of the main pole layer(s) are in the trench. In addition, a nonmagnetic refill layer, such as aluminum oxide, may be deposited.

A first chemical mechanical planarization (CMP) is performed, via step 110. The first CMP is sufficient to remove the magnetic layer(s) and any refill layer at a desired rate. In some embodiments, step 110 may include using a slurry appropriate for the material(s) to be removed, using a sufficient down force, and carrying out the CMP for a sufficient time. For example, a down force of at least three psi may be used. In some embodiments, the down force may be four through six psi. The CMP may terminate while some of the seed layer outside of the trench remains. In the event that a stop layer is used, the first CMP is terminated after at least a portion of the CMP stop layer is exposed. The remaining portion of the CMP stop layer may then be removed through a reactive ion etch. An excess portion of the seed layer(s) external to the trench is removed, via step 112. In some embodiments, step 112 includes performing an ion beam etch while a mask covers the main pole region.

A second CMP is performed, via step 114. The second CMP removes an excess portion of the nonmagnetic liner external to the trench. In some embodiments, the second CMP is a touch CMP. The second, touch CMP uses a lower down force, a shorter time, and/or a more dilute slurry than the first CMP. For example, a second slurry for the second CMP may be a 1:10 dilution (1 part slurry to ten parts water) of the first slurry used in the first CMP of step 110. In other embodiments, the second slurry used in the second CMP may be a 1:20 dilution of the first slurry. In other embodiments, the down force used in the second CMP is not more than one-half of the first down force used in the first CMP. In some embodiments, the down force in the second CMP of step 114 is not more than two psi. In some embodiments, the down force used in the second CMP is not more than 1.6 psi. The down force in the second CMP may be not more than one psi. In some embodiments, the down force is sufficient to perform a stable CMP. In some such embodiments, the down force for the second CMP is large enough to perform a stable CMP, but not larger. In some embodiments, the second CMP removes a relatively small amount of material. In some embodiments, the second CMP removes not more than approximately ten nanometers of the top of the transducer.

Fabrication of the main pole and transducer may then be completed. For example, the pole may be milled after the second CMP. The target pole height may thus be provided. In addition, bevels may also be provided. For example, the pole may be masked distal from the air-bearing surface (ABS) location and an angled ion mill may be performed to provide a top bevel. The ABS location is the region at which the ABS resides when fabrication of the transducer is complete. In addition, a bottom bevel may be provided, for example by masking the ABS location and milling the underlayer.

Figure 3:
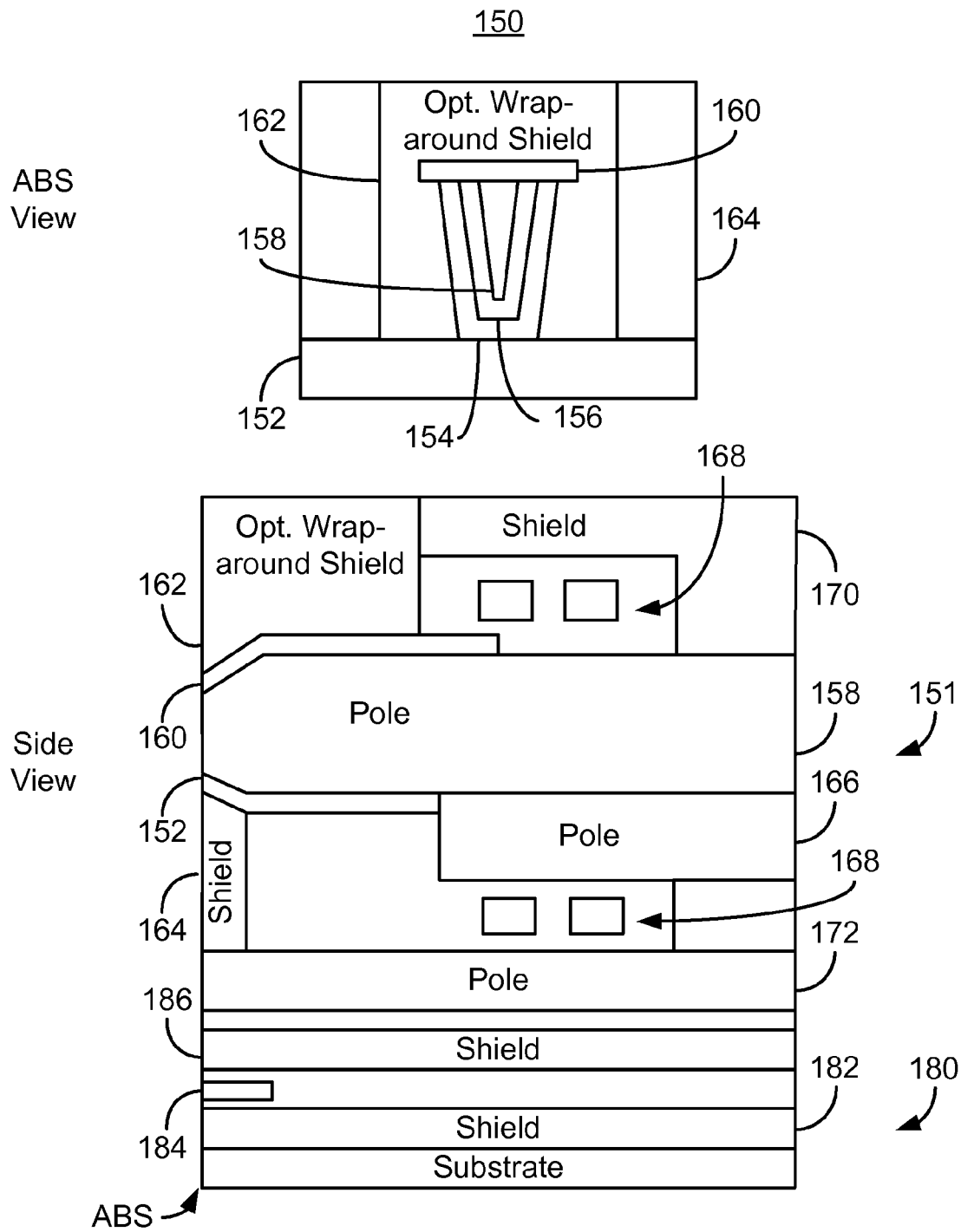
FIG. 3 is a diagram depicting an exemplary embodiment of a PMR transducer.

FIG. 3 is a diagram depicting ABS and side views of an exemplary embodiment of a portion of a head 150 that may be formed using the method 100. For clarity, FIG. 3 is not to scale. The head 150 shown includes a read transducer 182 and the PMR transducer 151. However, in another embodiment, the transducer 151 may be used in a head including only one or more write transducers 151. The read transducer 180 includes shields 182 and 186 as well as sensor 184. The PMR transducer 151 includes pole 166, shield 170, and coils 168 in addition to the PMR pole 158, underlayer 152, nonmagnetic liner 154, seed layer 156, gap layer 160, optional wrap-around shield 162, and nonmagnetic material 164. Other and/or different components may be fabricated in other embodiments. The pole 158 is shown as including leading and trailing edge (bottom and top) bevels. However, in other embodiments, the leading and/or trailing edge bevels may be omitted. Also shown is the ABS corresponding to the ABS location. For example, in some embodiments, the transducer 151 is lapped to expose the surface of the transducer 151 at the ABS location.

Using the method 100, the main pole 158 may be fabricated. There may be fewer variations in the height of the pole. In particular, the second, touch CMP may cause lower variations in the pole height. As a result, the pole width is also subject to fewer variations. The reduced variations in pole height and width may be both within a single wafer and wafer to wafer. Consequently, performance of the pole 158 and its fabrication using the method 100 may be improved. Further, the method 100 may be extended to higher areal density magnetic recording devices. Thus, flexibility of the method 100 may be improved.

Figure 4:
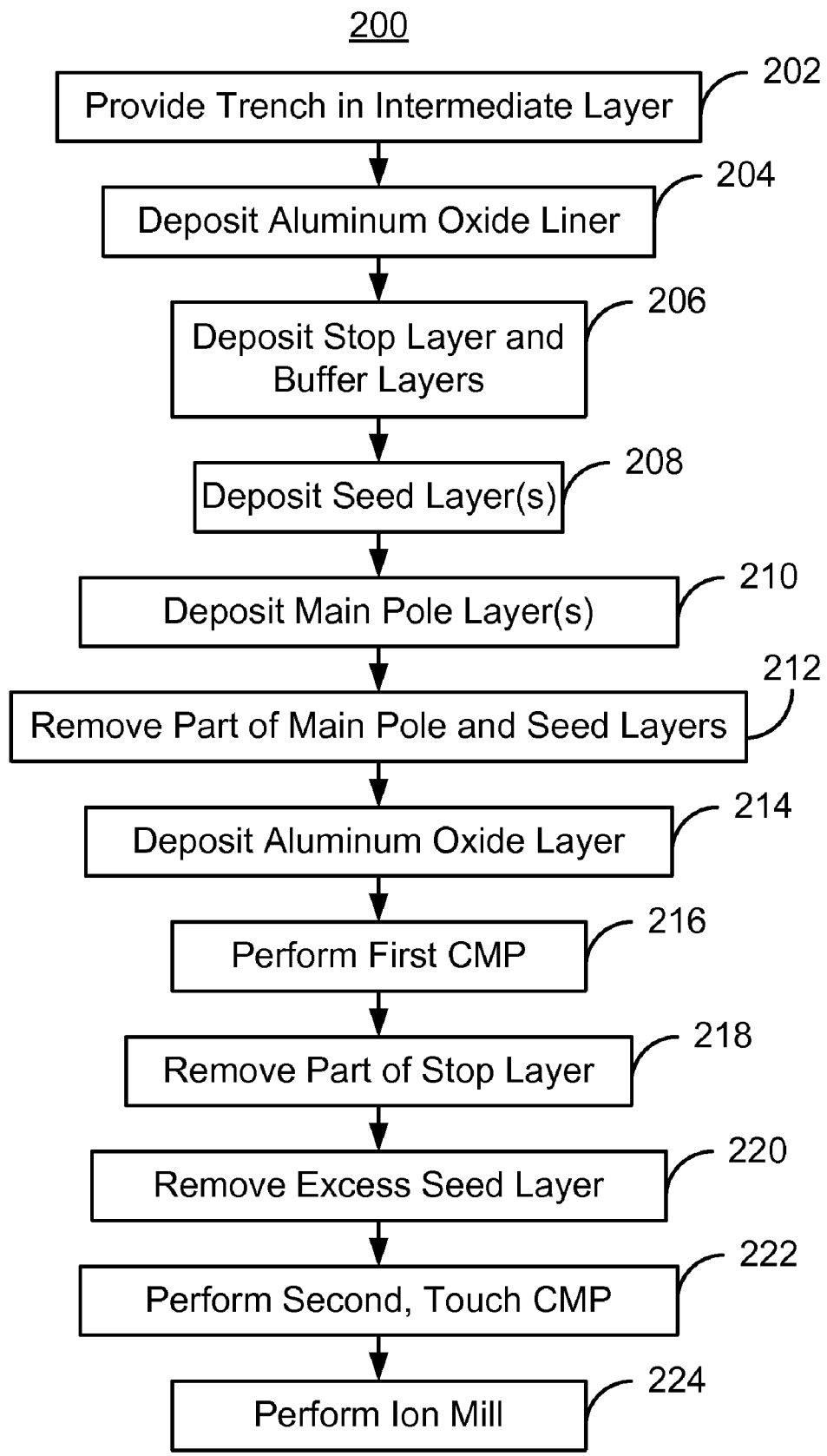
FIG. 4 is a flow chart depicting another exemplary embodiment of a method for fabricating a PMR transducer.

FIG. 4 is a flow chart depicting another exemplary embodiment of a method 200 for fabricating a PMR transducer. For simplicity, some steps may be omitted. FIGS. 5-17 are diagrams depicting side and ABS views of an exemplary embodiment of a portion of a PMR transducer during 250 fabrication. For clarity, FIGS. 5-17 are not to scale. Further, although FIGS. 5-17 depict the ABS location and ABS at a particular point in the pole, other embodiments may have other locations for the ABS. Referring to FIGS. 4-17, the method 200 is described in the context of the PMR transducer 300. However, the method 200 may be used to form another device (not shown). The PMR transducer 150 being fabricated may be part of a merged head that also includes a reader (not shown in FIG. 4-17) and resides on a slider (not shown) in a disk drive. The method 200 also may commence after formation of other portions of the PMR transducer 250. The method 200 is also described in the context of providing a single PMR transducer 250. However, the method 200 may be used to fabricate multiple transducers at substantially the same time. The method 200 and device 250 are also described in the context of particular layers. However, in some embodiments, such layers may include multiple sublayers. The intermediate layer is nonmagnetic and may be insulating. For example, aluminum oxide may be used for the intermediate layer. The underlayer may be nonmagnetic and an etch stop for the intermediate layer. For example, the underlayer may include Cr.

Figure 5:
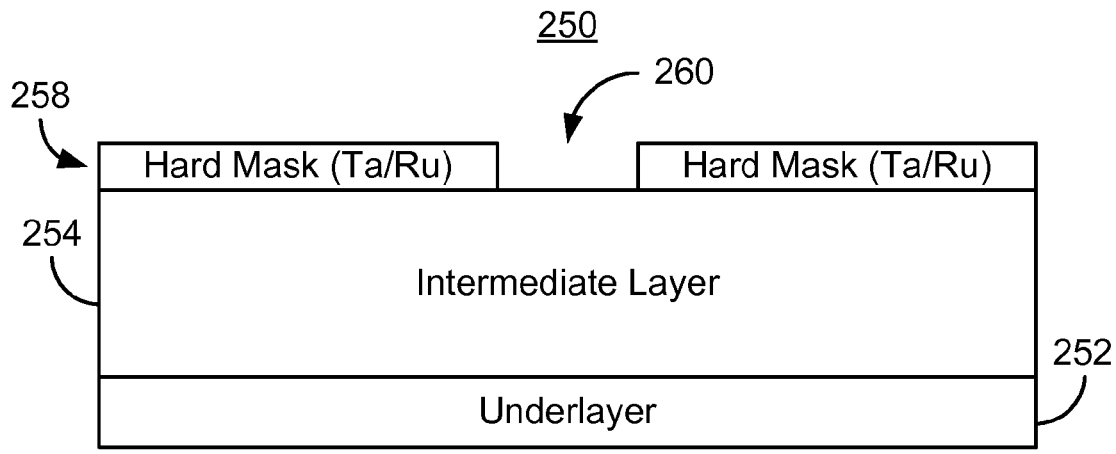
FIGS. 5-17 are diagrams depicting an exemplary embodiment of a perpendicular magnetic recording transducer during fabrication.
Figure 6:
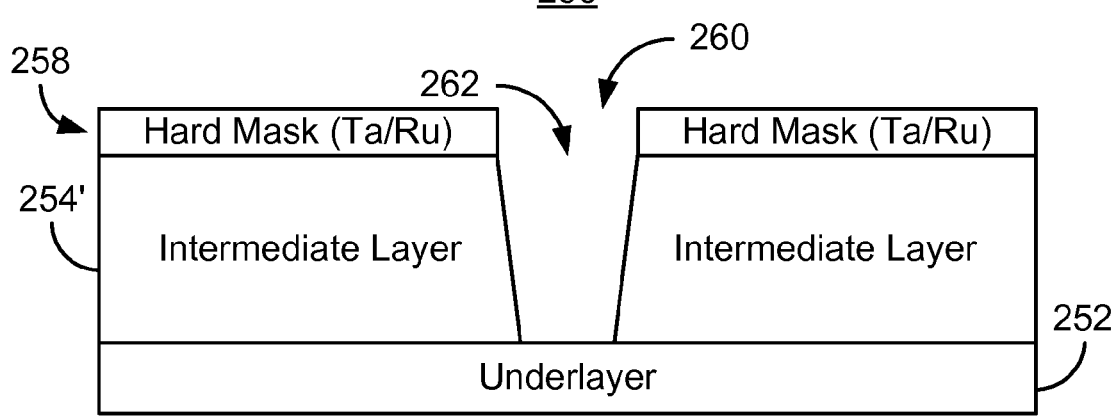

A trench is provided in the intermediate layer, via step 202. Step 202 may include providing a mask, such as a hard mask having an aperture located above the desired location of the trench. The mask may be formed by depositing a hard mask layer, then patterning the hard mask layer using photolithography. A removal process appropriate for the intermediate layer is used in step 202. The underlayer on which the intermediate layer resides may be a stop layer for the removal process used. For example, an alumina reactive ion etch (RIE) may be performed in step 202 to form the trench. FIG. 5 depicts the PMR head 250 during the step 202. Thus, underlayer 252 and intermediate layer 254 are shown. The intermediate layer 254 may include aluminum oxide, while the underlayer 252 may include Cr. The hard mask 258 having aperture 260 therein is also shown. In some embodiments, the hard mask 258 is a bilayer of Ta/Ru. The aperture 260 corresponds to the desired location of the trench. FIG. 6 depicts the PMR head 250 after step 202 is performed. Thus, a trench 262 having a top wider than its bottom has been formed in the intermediate layer 254'. In the embodiment shown, the trench 262 extends to the underlayer 252. However, in another embodiment, the trench need not extend through the intermediate layer 254'.

Figure 7:
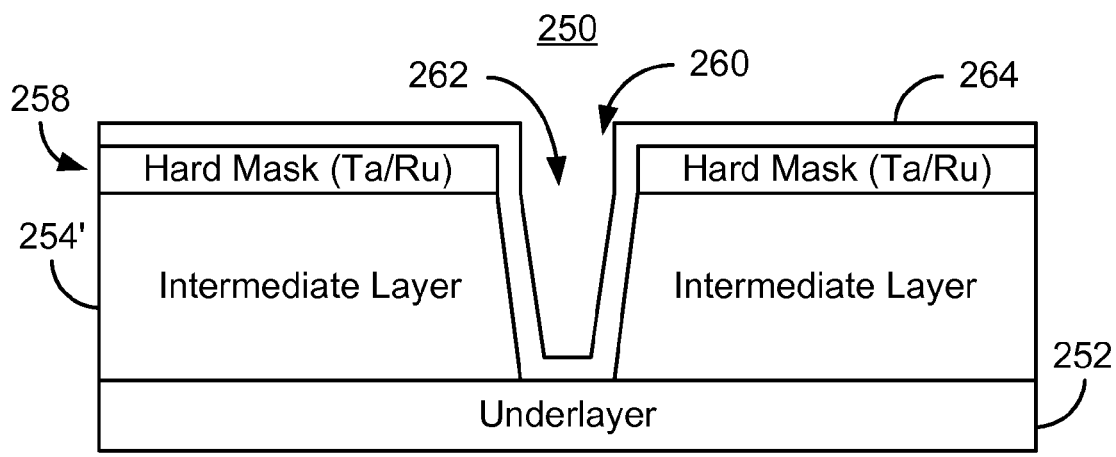

A nonmagnetic, aluminum oxide liner is deposited after the trench is formed, via step 204. In some embodiments, the aluminum oxide may be deposited using ALD. FIG. 7 depicts the transducer after step 204 is performed. Thus, the aluminum oxide liner 264 is shown. A portion of the liner 264 resides in the trench 262.

Figure 8:
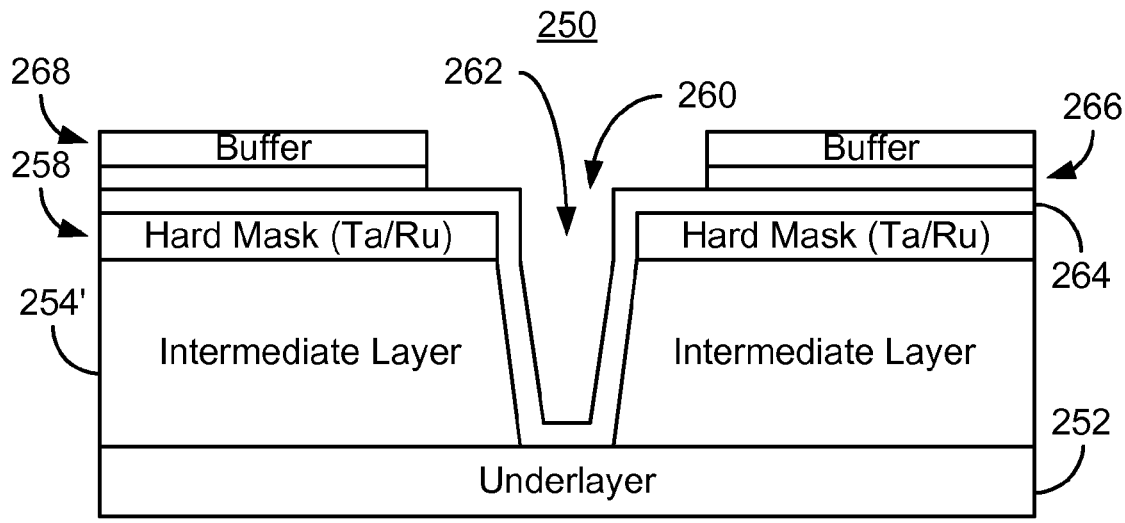

A CMP stop layer is deposited, via step 206. In some embodiments, a buffer layer is also deposited in step 206. In some embodiments, these layer(s) reside outside of the trench. FIG. 8 depicts the head 250 after step 206 is performed. Thus, CMP stop layer 266 and buffer layer 268 are shown. The CMP stop layer 266 may be a diamond-like carbon (DLC) layer. The buffer layer 268 may be an aluminum oxide layer.

Figure 9:
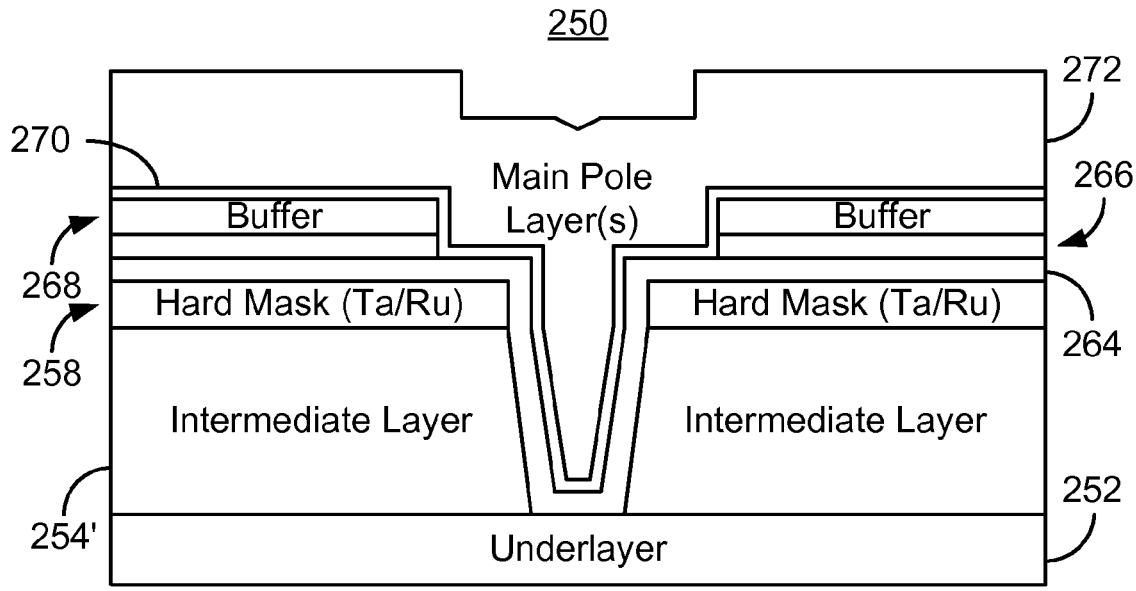

Seed layer(s) for the main pole are deposited, via step 208. Main pole layer(s) are deposited, via step 210. FIG. 9 depicts the head 250 after step 210 is performed. Thus, seed layer(s) 270 and main pole layer(s) 272 are shown. A portion of the seed layer(s) 270 reside in the trench 262. The seed layer(s) 270 may have a thickness of not more than two hundred and fifty nanometers. However, in other embodiments, different thicknesses may be used. The main pole layer(s) 272 are magnetic and may include one or more high saturation magnetization materials, such as CoNiFe. For example sputtering and/or plating may be used in step 210 for depositing the pole layer(s) 272. The materials used for the pole layer(s) 272 may be a single layer such as an alloy, or a multilayer. A portion of the main pole layer(s) are in the trench. In addition, a nonmagnetic refill layer may be deposited.

Figure 10:
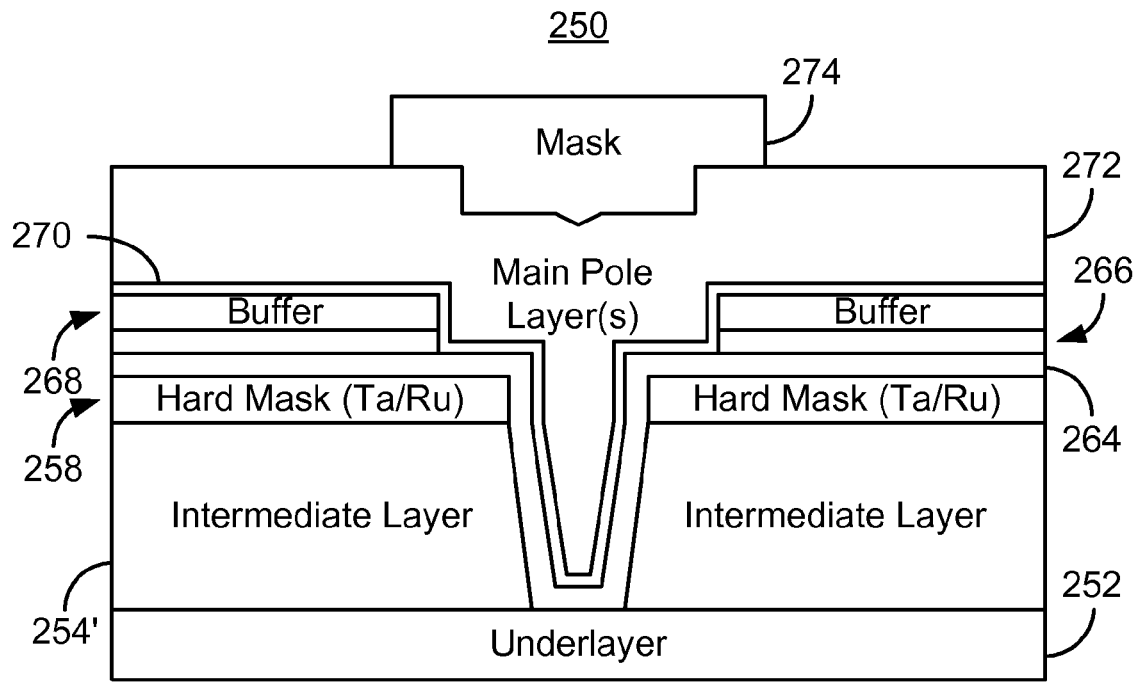
Figure 11:
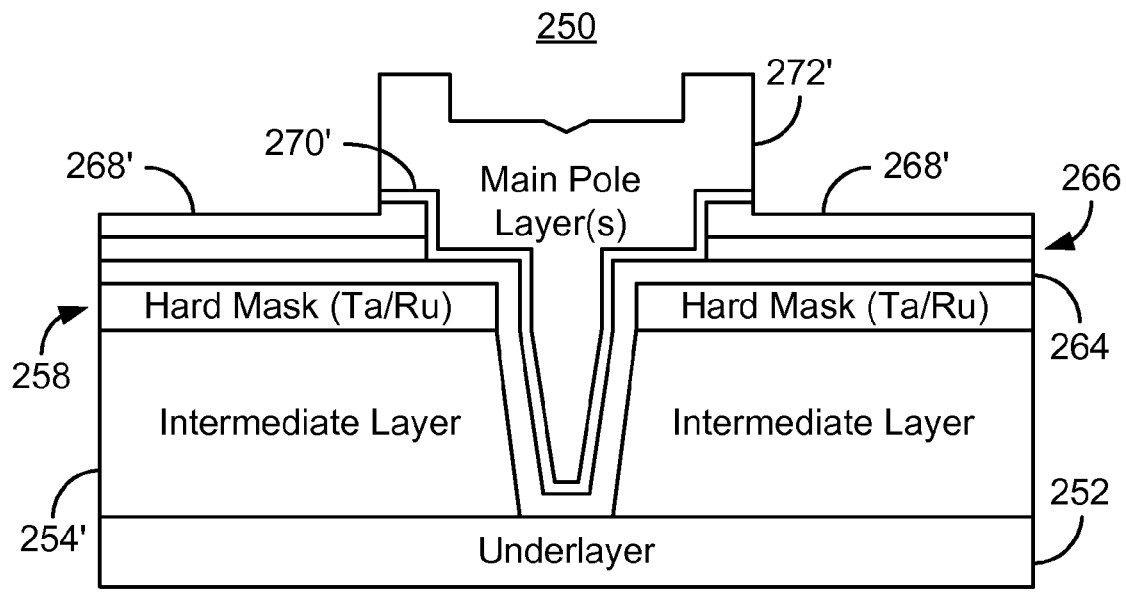

A portion of the main pole layer(s) 272 and seed layer(s) 270 outside of the trench 262 are removed, via step 212. FIG. 10 depicts the head 250 during one embodiment of step 212. For clarity, aperture 260 and trench 262 are no longer labeled. A mask 274 has been provided above the location of the main pole. The exposed portions of the main pole layer(s) 272 and seed layer(s) 270 may then be ion beam etched or otherwise removed. The mask 274 may also be removed after the etch process is completed. FIG. 11 depicts the head 250 after step 212 is completed. Thus, only a portion of the main pole layer(s) 272' and seed layer(s) 270' has been removed. In addition, a portion of the buffer layer 268' has been removed.

Figure 12:
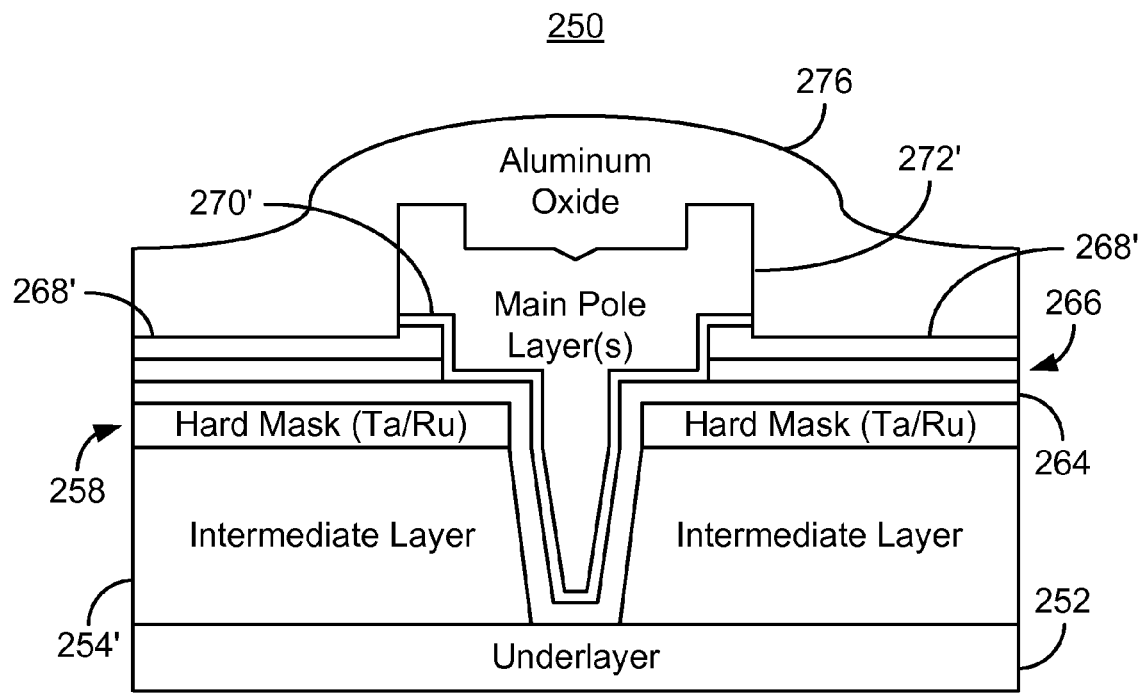

An insulating layer is deposited, via step 214. Step 214 may include depositing a layer of aluminum oxide. For example, at least sixty nanometers of aluminum oxide might be deposited in step 214. FIG. 12 depicts the head 250 after step 214 is performed. Thus, aluminum oxide layer 276 is shown. In the embodiment shown, the aluminum oxide 276 is a full film deposited.

Figure 13:
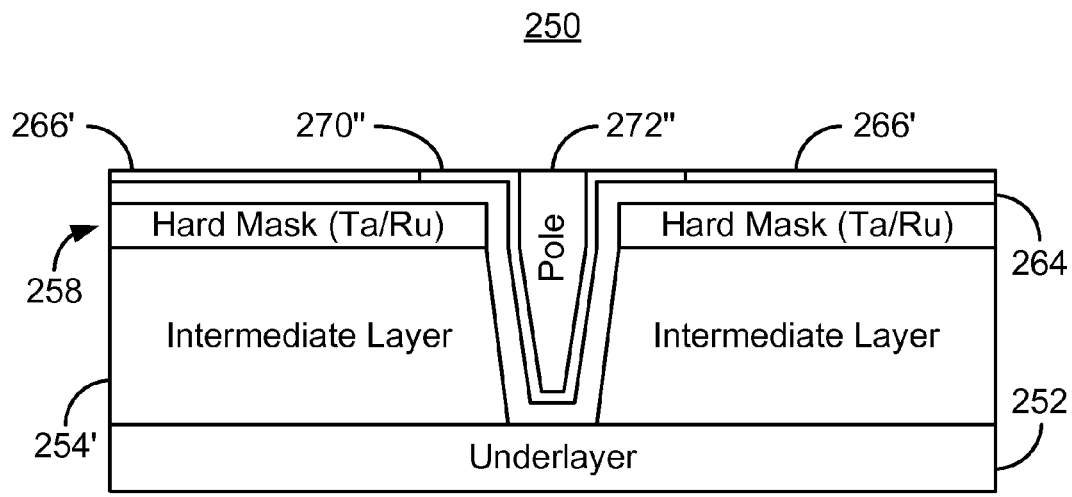

A first chemical mechanical planarization (CMP) is performed, via step 216. The first CMP is sufficient to remove the magnetic layer(s) 272' and the aluminum oxide layer 276 at a desired rate. In some embodiments, step 216 may include using a slurry appropriate for the material(s) to be removed, using a sufficient down force, and carrying out the CMP for a sufficient time. For example, a down force of at least three psi may be used. In some embodiments, the down force may be four through six psi. The CMP may terminate while some of the seed layer outside of the trench remains. The first CMP is terminated after at least a portion of the CMP stop layer 266' is exposed. FIG. 13 depicts the head 250 after completion of step 216. Thus, the top surface of the head 250 is substantially flat. However, although not shown, some dishing may occur.

Figure 14:
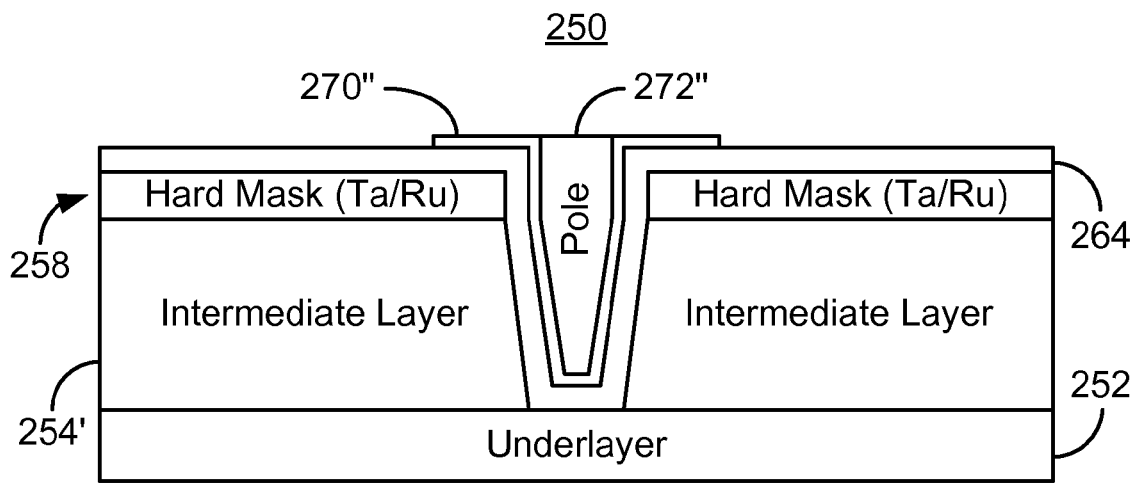

The remaining portion of the CMP stop layer 266' is removed, via step 218. This is accomplished through a reactive ion etch. FIG. 14 depicts the head 250 after step 218 is performed. Thus, the CMP stop layer 266' is no longer present.

Figure 15:
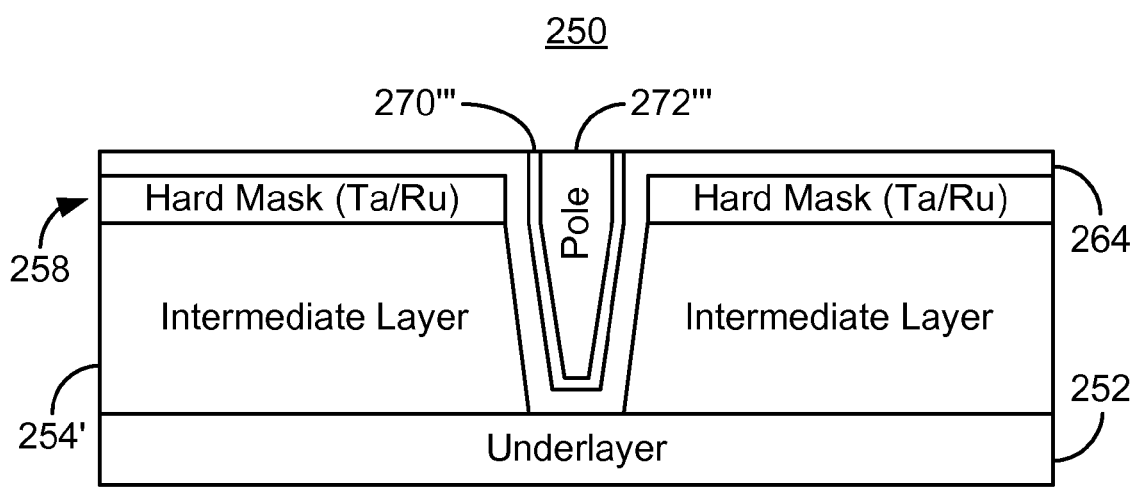

An excess portion of the seed layer(s) external to the trench is removed, via step 220. Step 220 includes performing an ion beam etch. FIG. 15 depicts the head 250 after step 220 is performed. Thus, the nonmagnetic liner 264 is exposed. A remaining portion of the seed layer(s) 270''' and magnetic layer(s) 272''' are shown.

Figure 16:
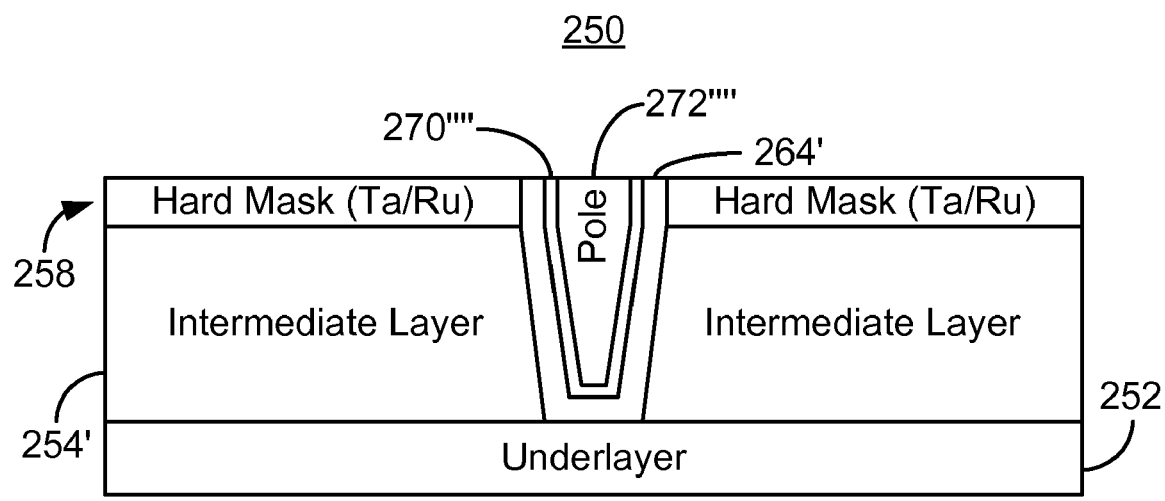

A second CMP is performed, via step 222. The second CMP removes an excess portion of the nonmagnetic liner external to the trench. In some embodiments, the second CMP is a touch CMP. The second, touch CMP uses a lower down force, a shorter time, and/or a more dilute slurry than the first CMP. For example, a second slurry for the second CMP may be a 1:10 dilution (1 part slurry to ten parts water) of the first slurry used in the first CMP of step 110. In other embodiments, the second slurry used in the second CMP may be a 1:20 dilution of the first slurry. In other embodiments, the down force used in the second CMP is not more than one-half of the first down force used in the first CMP. In some embodiments, the down force in the second CMP is not more than three psi. In some such embodiments, the down force in the second CMP of step 114 is not more than two psi. In some embodiments, the down force used in the second CMP is not more than 1.6 psi. The down force in the second CMP may be not more than one psi. In some embodiments, the down force is sufficient to perform a stable CMP. In some such embodiments, the down force for the second CMP is large enough to perform a stable CMP, but not larger. In some embodiments, the second CMP removes a relatively small amount of material. In some embodiments, the second CMP removes not more than approximately ten nanometers of the top of the transducer. FIG. 16 depicts the head 250 after step 222 is performed. Thus, hard mask 258 is exposed.

Figure 17:
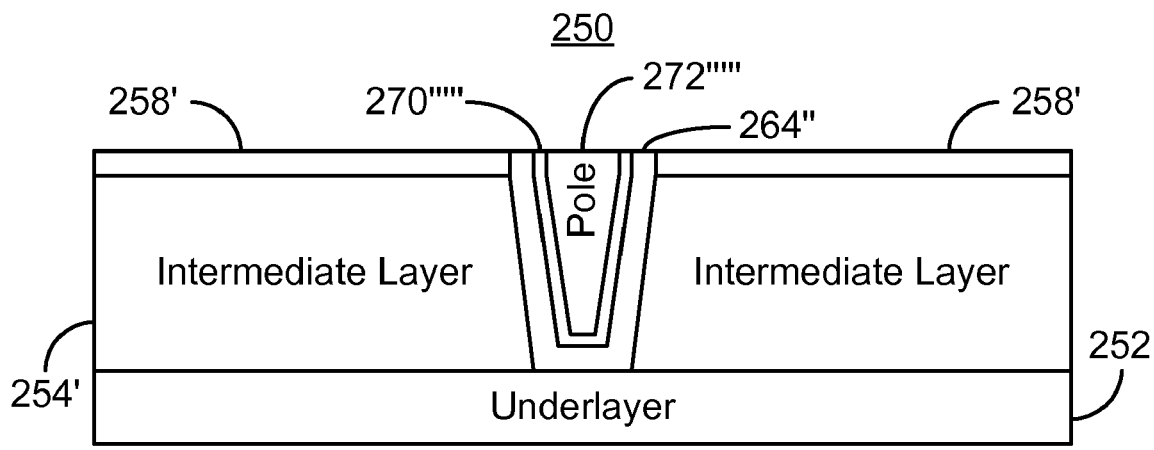

An ion mill is performed, via step 224. The target height of the pole 272'''' may thus be provided. In some embodiments, not more than approximately thirty nanometers is removed to obtain the desired pole height. FIG. 17 depicts the head 260'. Thus, the pole 272'''' has the desired height.

Using the method 200, the main pole 272'''' may be fabricated. There may be fewer variations in the height of the main pole 272''''. In particular, the second, touch CMP removes a small thickness of the main pole 272''''. In some embodiments, for example, not more than ten nanometers may be removed by the second CMP in step 222. This may reduce variations in the pole height after the first CMP of step 216. Further, because the first CMP may remove less of the head 250, the variations from the first CMP may also be reduced. The ion mill performed in step 224 may also remove a relatively small thickness of material. For example, in some embodiments, not more than thirty nanometers is removed. As a result, the ion mill of step 224 introduces fewer additional variations. The height of the pole 272'''' may thus be more uniform. The pole width is also subject to fewer variations. Consequently, performance of the pole 272'''' fabricated using the method 200 may be improved.

We claim:

1. A method for fabricating a main pole for magnetic recording transducer having an intermediate layer, the method comprising:
   providing a trench in the intermediate layer;
   depositing a nonmagnetic liner, a portion of the nonmagnetic liner residing in the trench;
   depositing at least one seed layer, a portion of the at least one seed layer residing in the trench;
   depositing at least one main pole layer, the at least one main pole layer being magnetic, a portion of the at least one main pole layer residing in the trench;
   performing a first chemical mechanical planarization (CMP);
   removing an excess portion of the at least one seed layer external to the trench through an ion beam etch; and
   performing a second CMP to remove an excess portion of the nonmagnetic liner external to the trench.

2. The method of claim 1 wherein the first CMP uses a first down force, a first slurry, and a first time and wherein the second CMP uses a second down force, a second slurry and a second time, at least one of the second down force being less than the first down force, the second slurry being a dilution of the first slurry, and the second time being less than the first time.

3. The method of claim 2 wherein the dilution is at least a 1:10 dilution of the first slurry.

4. The method of claim 2 wherein the second down force is not more than one-half of the first down force.

5. The method of claim 2 wherein the second down force is not more than three psi.

6. The method of claim 2 wherein the second down force is not more than two psi.

7. The method of claim 2 wherein the second down force is not more than 1.6 psi.

8. The method of claim 2 wherein the second down force is not more than one psi.

9. The method of claim 2 wherein the second down force is sufficient to perform a stable CMP.

10. The method of claim 1 further comprising:
    depositing a CMP stop layer external to the trench after the nonmagnetic liner is provided and before the at least one main pole layer is provided.

11. The method of claim 10 wherein the step of performing the first CMP further includes:
    terminating the first CMP after at least a portion of the CMP stop layer is exposed.

12. The method of claim 11 further comprising removing a remaining portion of the CMP stop layer through a reactive ion etch.

13. The method of claim 1 further comprising:
    performing an ion mill after the second CMP, the ion mill removing a portion of the at least one main pole layer to provide a target pole height.

14. The method of claim 1 wherein the nonmagnetic liner includes aluminum oxide.

15. The method of claim 1 wherein the main pole has a bottom and a top wider than the bottom.

16. A method for fabricating a main pole for magnetic recording transducer having an intermediate layer, the method comprising:
    providing a trench in the intermediate layer, the trench having a bottom and a top wider than the bottom;
    depositing an aluminum oxide liner using atomic layer deposition, a portion of the aluminum oxide liner residing in the trench;
    depositing a diamond-like carbon (DLC) stop layer external to the trench after the aluminum oxide liner is provided;
    depositing at least one seed layer after the DLC stop layer is provided, a first portion of the at least one seed layer residing in the trench;
    depositing at least one main pole layer, the at least one pole layer being magnetic, a first portion of the at least one main pole layer residing in the trench;
    removing a second portion of the at least one main pole layer and a second portion of the at least one seed layer external to the trench;
    depositing an aluminum oxide layer;
    performing a first chemical mechanical planarization (CMP) using a first down force, a first slurry, and a first time, the first CMP removing a portion of the aluminum oxide layer, removing a third portion of the at least one main pole layer, removing a third portion of the at least one seed layer, an excess portion of the at least one seed layer external to the trench, and exposing a portion of the DLC stop layer;
    removing the portion of the DLC stop layer using at least one reactive ion etch;
    removing the excess portion of the at least one seed layer external to the trench through an ion beam etch;
    performing a second CMP to remove an excess portion of the aluminum oxide liner external to the trench, the second CMP using a second down force, a second slurry and a second time, the second down force being less than the first down force, the second slurry being a dilution of the first slurry, and the second time being less than the first time, the dilution being at least a 1:10 dilution, the second down force being not more than two psi; and
    performing an ion mill after the second CMP, the ion mill removing a fourth portion of the at least one main pole layer to provide a target pole height.

* * * * *